(12) United States Patent
Chen et al.

(10) Patent No.: US 7,165,193 B2
(45) Date of Patent: Jan. 16, 2007

(54) EFFICIENT MEMORY ALLOCATION SCHEME FOR DATA COLLECTION

(75) Inventors: Joey Y. Chen, Irvine, CA (US); L. Randall Mote, Laguna Hills, CA (US); Thuji Simon Lin, Irvine, CA (US); Anders Hebsgaard, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 257 days.

(21) Appl. No.: 10/972,622

(22) Filed: Oct. 25, 2004

(65) Prior Publication Data

US 2005/0060504 A1 Mar. 17, 2005

Related U.S. Application Data

(63) Continuation of application No. 09/785,794, filed on Feb. 16, 2001, now Pat. No. 6,836,861.

(60) Provisional application No. 60/183,615, filed on Feb. 18, 2000.

(51) Int. Cl.
*G06F 11/34* (2006.01)

(52) U.S. Cl. .................. 714/45; 714/46; 717/124; 717/128

(58) Field of Classification Search .............. 714/45, 714/46; 717/124, 128
See application file for complete search history.

(56) References Cited

U.S. PATENT DOCUMENTS 5,560,036 A 9/1996 Yoshida
5,768,152 A 6/1998 Battaline et al.

FOREIGN PATENT DOCUMENTS

EP 0 316 609 A2 5/1989

*Primary Examiner*—Jack A. Lane
(74) *Attorney, Agent, or Firm*—Sterne, Kessler, Goldstein & Fox PLLC

(57) ABSTRACT

A system and method that provides an integrated circuit which includes a small on-chip buffer to store collected data, thereby shifting the burden of storing the majority of the collected data to external system memory, which is typically comprised of commodity memory chips. Since this external system memory is already in use by other system functions, utilizing such unused regions of this external memory increases overall hardware efficiency, while achieving lower ASIC manufacturing cost.

21 Claims, 2 Drawing Sheets

EFFICIENT MEMORY ALLOCATION SCHEME FOR DATA COLLECTION

CROSS-REFERENCE TO RELATED APPLICATION(S)

This application is a continuation of U.S. patent application Ser. No. 09/785,794, filed Feb. 16, 2001 now U.S. Pat. No. 6,836,861, which claims the benefit of the filing date of U.S. Provisional Patent Application No. 60/183,615, filed Feb. 18, 2000. The entire content in each of the above-cited applications is incorporated herein by reference.

FIELD OF THE INVENTION

The present invention generally relates to the field of data storage. More particularly, the invention relates to an efficient system and method for storing and transferring data within a data-collecting system, such as statistical information collected from monitored functions in communications transceivers.

BACKGROUND OF THE INVENTION

Orthogonal Frequency Domain Multiplexing (OFDM) transceiver application-specific integrated circuits (ASIC), such as those used in wireless modems, often include a data collection function that monitors various components of the circuit and collects corresponding data for subsequent processing, often by an external processor. Typically, the collected data is statistical data relating to the performance of the respective components.

The ASIC's data collection function gathers information from internal processing units of the ASIC and forwards this information to a host processor for postprocessing. For example, system requirements may require monitoring relevant parameters of internal blocks, such as power, antenna gain, and the like, with the collected data being processed to determine whether fine tuning of the system is needed.

In order to achieve this data collection function, the prior art systems employ large amounts of on-chip memory (e.g., 12K (12,000) bytes) to store the collected statistical information within the ASIC prior to forwarding that data to the host processor for processing. This approach of using large on-chip memory to store collected statistics is undesirable because it increases the cost of the ASIC, and does not exploit unused regions of existing system memory.

Thus, what is needed is a system and method for efficiently collecting and transferring data from an ASIC or other like circuit to external system memory. The present invention addresses one or more of these desirable features.

SUMMARY OF THE INVENTION

Briefly, the present invention is directed to a system and method that provides an integrated circuit which includes a small on-chip buffer to store collected data, thereby shifting the burden of storing the majority of the collected data to external system memory, which is typically comprised of commodity memory chips. Since this external system memory already exists for use by other system functions, utilizing unused regions of this external memory increases overall hardware efficiency, while achieving lower ASIC manufacturing cost.

In one embodiment, the invention is directed to a system for managing data generated by one or more sources, and includes a host processor and memory unit, and a circuit including one or more sources, a controller connected to the one or more sources, and a buffer memory, where the controller is operative to periodically receive data from the one or more sources, transfer the data to the buffer, and at a predetermined point the buffer is controlled to transfer the data to the memory unit.

In another embodiment, the invention is directed to a method for managing data in an integrated circuit, including receiving data from one or more sources within the integrated circuit, storing the data in a buffer memory, transferring the data from the buffer to an external memory location upon reaching a predetermined condition, and then repeating the process.

BRIEF DESCRIPTION OF THE DRAWINGS

Other features and advantages of the invention will become apparent from a description of the figures, in which.

DETAILED DESCRIPTION OF THE INVENTION

Figure 1:
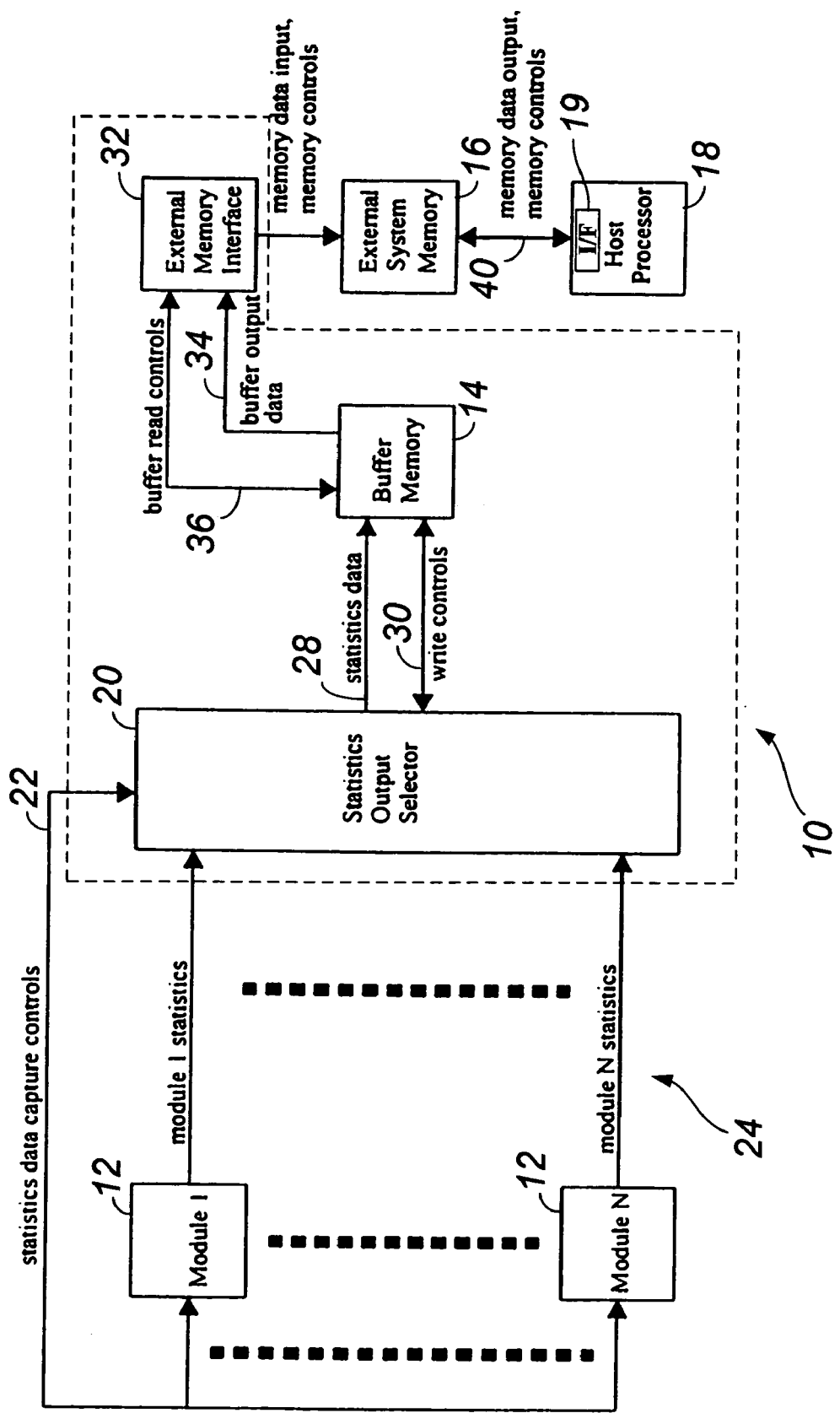
FIG. 1 shows in block diagram form an overview of one illustrative embodiment of a system according to the present invention.

Referring now to the figures, and in particular to FIG. 1, there is shown one illustrative embodiment of a circuit 10 for collecting and transferring data according to the present invention. Circuit 10 receives data from one or more data collecting and/or generating modules 12, and forwards such data to a buffer memory device 14. Buffer memory device 14 periodically transfers the data to an external system memory 16, which is accessed by a host processor 18 for processing of the collected data, as is described in more detail below.

In one embodiment, circuit 10 is in the form of an application-specific integrated circuit (ASIC) that is designed to collect data from the module or modules 12. For example, circuit 10 may interact with a plurality of modules 12, where each module monitors a particular system function and generates corresponding data. Such data can correspond to various parameters, such as voltage levels, antenna gain, and the like. Thus, it will be understood by those skilled in the art that the data can take many different forms. For ease of description, such data will be collectively referred to herein as "statistics data". Moreover, while only two modules are shown in FIG. 1, it will be apparent that the number of modules can be one, two, or any other number of modules.

Circuit 10 includes a controller 20, which in one embodiment is in the form of a statistics output selector (hereinafter referred to as "controller"). As described above, controller 20 may interact with one or more modules 12. In one embodiment, data capture control signals are transmitted between the controller 20 and the module(s) 12 over a signal line 22 upon reaching respective time slots. Each module may be assigned to selected time slots, and when those pre-selected time slots are detected, the controller receives data from that module and writes the received data to the buffer 14. Alternatively, the module(s) 12 may be designed to perform periodically monitoring and to automatically collect corresponding data, which is then transmitted to controller 20 over a data bus 24 or any other suitable signal line or lines for writing to buffer 14. In yet another embodiment, handshaking may be implemented between controller 20 and buffer 14 for monitoring the status of the buffer 14 to determine the progress of the write operation.

In the situation where controller 20 is connected to plural modules 12 over data bus 24, controller 20 is preferably designed to perform a multiplexing function to transfer the collected data from plural modules over one or more data lines 26 to buffer memory device 14. Such multiplexing may be conducted in any suitable manner, such as time division multiplexing or the like.

Buffer memory device 14 is connected to controller 20 via a pair of signal lines 28 and 30. Signal line 28 provides for transmission of the collected data from controller 20 to buffer memory device 14 for temporary storage, while signal line 30 provides for the two-way transmission of write control signals between buffer 14 and controller 20, as described above.

Buffer memory device 14 is also connected to an external memory interface 32 via signal lines 34 and 36. Signal line 34 provides for transmission of stored data from buffer memory device 14 to the interface 32, while signal line 36 provides for the two-way transmission of read control signals between buffer memory device 14 and interface 32.

In one embodiment, when a minimum quantity of new data is present in the buffer 14, and the external device which will use the data is available for processing the data, read controls are asserted to the buffer 14 to retrieve the data from buffer 14 and transfer the data to the external memory xx. Thus, when the buffer 14 achieves a predetermined level of fullness (based on the size of buffer 14 and the particular statistics mode), read request signals are transmitted from buffer 14 to interface 32. The status of the external device (e.g., processor 18) is then determined and, when it is available, the read controls are asserted to buffer 14, such that the data is transferred to external memory 16 for accessing by the external device.

Interface 32 connects to external system memory 16 via signal line 38, and transfers the stored data to memory 16 at a predetermined, unused location of that memory 16. Host processor 18, via a processor interface 19, may then access memory 16 over signal line 40 and retrieve the data for processing.

Buffer memory device 14 is a relatively small memory device. In one embodiment, buffer memory device 14 is capable of storing 128 bytes of data. However, it will be understood that the size of buffer memory device will vary, depending on the number of modules 12, the capabilities of host processor 18, and the like. Thus, in one embodiment the size of the buffer memory can be between about 100 and about a few kilobytes.

Buffer memory device 14 may also have other attributes, such as an input pointer (where new data will be written into the buffer), and an output pointer (where the next item will be read from) and/or a count of the space used or free. Such attributes may be used during the control signal stages of the circuit 10, as is described below.

The operation of circuit 10, in one illustrative embodiment, is now described in greater detail. Operation begins with controller 20 transmitting data capture control signals to the respective modules 12 over signal line 22 to coordinate the receipt of data from the respective modules 12. It will be understood that, in the case of multiple modules 12, controller 20 may either assign discrete time slots for each module 12 to transmit its data, or controller 20 may simultaneously receive data from multiple modules 12 and perform a multiplexing function to transmit the data to buffer memory device 14. Alternatively, the modules may be programmed to automatically perform their respective data collection and/or generation functions, and to forward such data on to controller 20.

In any event, prior to transmitting data to buffer memory device 14, controller 20 transmits write control signals to buffer memory device 14 over signal line 30. Those control signals may include a request from controller 20 to buffer memory device 14, requesting to transmit data to buffer memory device 14. Included in the request may be the amount of data to be transmitted. Buffer memory device 14 may then determine the amount of available memory and transmit a reply signal to controller over signal line 30 indicating that it is ready to receive the data. Controller 20 then transmits the data over data line 28, and the data is stored in buffer memory 14.

At a predetermined point in the process, buffer read control signals are transmitted between buffer memory device 14 and interface 32 over control signal line 36. In one embodiment, interface 32 transmits a request to read data from buffer memory device 14, and device 14 transmits a reply indicating the amount of new data to be read. Alternatively, buffer memory device 14 can transmit a signal to interface 32 at a predetermined point in the process, for example in the situation where the buffer memory 14 contains some minimum amount of new data, or when buffer 14 is full of new data and controller 20 is requesting to transmit additional data to the buffer 14.

At the appropriate point, for example when the external device (e.g., host processor 18) is available to access data from external memory 16, buffer memory device 14 then transmits the stored data over data line 34 to interface 32, which writes the data to a preselected location in external system memory 16, based upon memory control signals transmitted between interface 32 and memory 16. Host processor 18 may then access the data in memory 16 to process the data.

Figure 2:
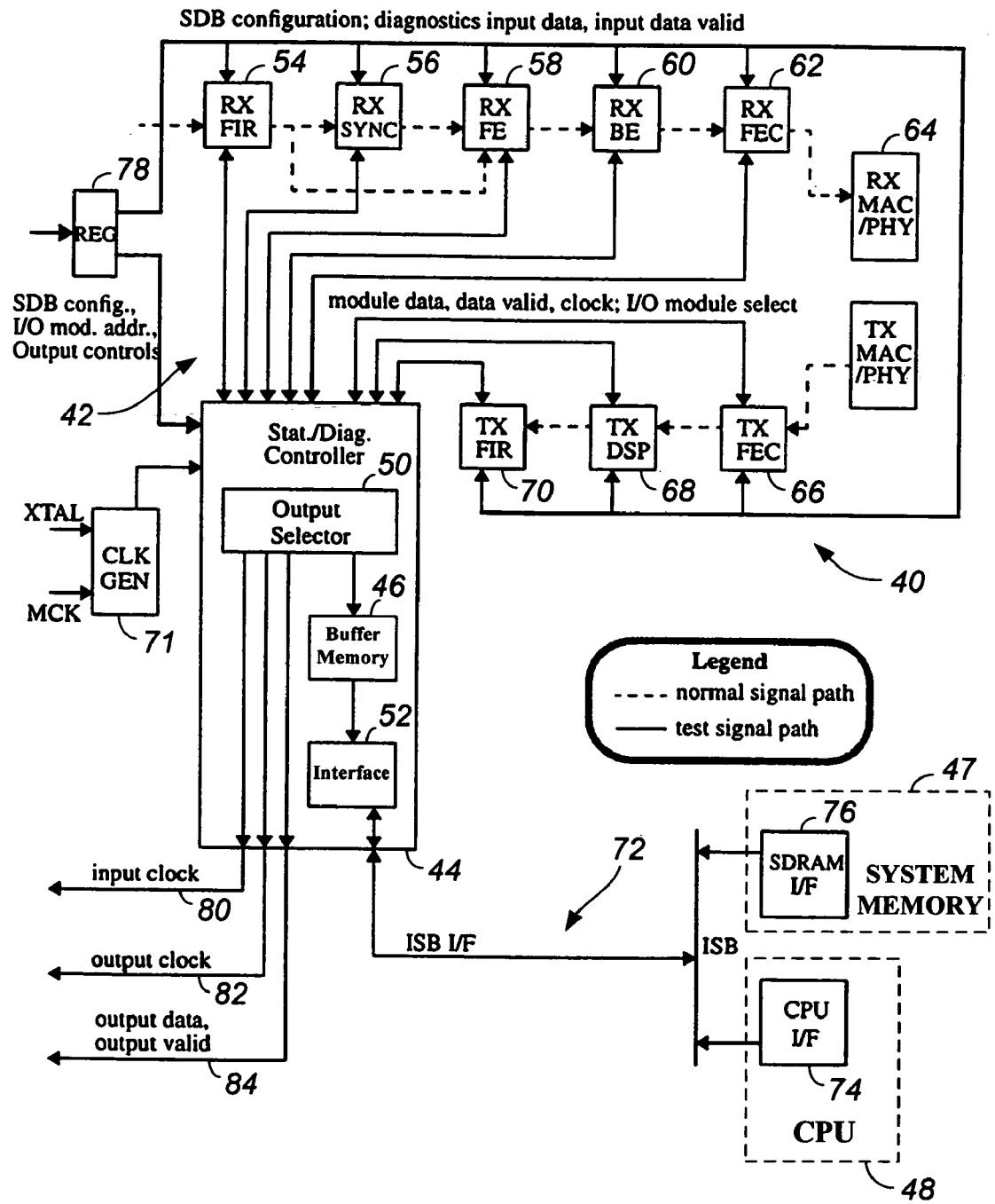
FIG. 2 shows in block diagram form in more detail an overview of an illustrative embodiment of a system according to the present invention which includes, in combination, both a statistics collection function and diagnostic function.

Referring now to FIG. 2, there is shown an ASIC 40 in which the present invention can be implemented. The ASIC includes a plurality of modules, each of which generates data relating to a particular parameter. In addition, designated modules may be stimulated during a diagnostics mode of operation with data from input test pins, with such module generating output data that either drives output test pins, or drives another module, which then generates output that drives the test pins. The ASIC includes a Statistics/Diagnostics Bus (SDB) 42 that provides the means through which the normal run-time statistics as well as testing related system diagnostic information are collected.

Under normal mode of operation, parameters accessible within the ASIC, in groups of up to 128 bytes per burst, may be captured by an SDB Controller 44 and stored in buffer memory 46 before being relayed to the external system, including system memory 47 and a Central Processing Unit (CPU) (or Host Processor) 48, for analysis, as described above in connection with FIG. 1. It will be understood by those skilled in the art that some modules have less than 128 bytes of data per burst to be collected, and that some modules may generate more than 128 bytes per burst.

Within the ASIC 40, datapath modules can generate statistics data characterizing system performance and operating conditions on a periodic basis when the statistics collection function is enabled.

In one embodiment, the respective modules generate data representative of the respective characteristics being monitored on a per burst of data basis. For example, within one burst, a first one of the modules will generate a measurement of the data that it is processing, such as keeping the statistics of the input that it is receiving. Under the control of controller 44, that data is provided to data output selector 50 for storage in the buffer memory device 46. Data output selector 50, under appropriate write controls, multiplexes the data from the respective modules onto buffer memory 46. Under buffer read controls, an external memory interface 52, such as a Direct Memory Access (DMA) device, provides an interface to external system memory 47, such as a Synchronous Dynamic Random Access Memory (SDRAM). The information stored in external system memory 47 can then be accessed by CPU/Host Processor 48, via interface 74 and appropriate software, for use by various aspects of the system as desired.

In detail, the embodiment of FIG. 2 includes the following data collecting modules: a Receiver Finite Impulse Response Filter RXFIR 54, Receiver Synchronization block RXSYNC 56, Receiver Front End RXFE 58, Receiver Back End RXBE 60, and Receiver Forward Error Correction block RXFEC 62, under the control of Receiver Media Access Control layer/Physical layer RX MAC/PHY 64. Similarly, data (e.g., diagnostic data) can be collected from Transmit Forward Error Correction block TXFEC 66, Transmit Digital Signal Processor TXDSP 68, and Transmit Finite Impulse Response filter TXFIR 70. Controller 44 is fed by Clock Generator CLKGEN 71 which is responsive to clock signals XTAL and MCK. Host processor 48 and external memory 47 communicate with each other and with controller 44 over an Internal System Bus (ISB)72, via respective CPU interface 74, external system memory interface 76, and external memory interface 52. Controller 44 can also be involved with handling diagnostics under the control of register 78, and provide input/output clocking and output data and valid signals on output lines 80, 82, and 84 for diagnostics purposes.

Thus, it will be understood by those skilled in the art that the present invention has utility in various ASICs as well as in other circuits. The specific example shown in FIG. 2 is meant for illustrative purposes to illustrate one such implementation.

From the foregoing, it will be apparent that the present invention efficiently manages the storage of collected data, such as statistics data and the like. By shifting the burden of storing the bulk of the collected data to previously unutilized regions of the external system memory, the invention achieves a relatively low-cost ASIC due to the relatively small on-chip memory size, as well as increased hardware efficiency due to utilization of previously unused region of system memory.

While the above description contains many specific features of the invention, these should not be construed as limitations on the scope of the invention, but rather as exemplary embodiments thereof. Many other variations are possible. Accordingly, the scope of the invention should be determined not by the embodiments illustrated, but by the appended claims and their legal equivalents.

What is claimed is:

1. A system for managing data, comprising:
an integrated circuit having a source of statistics data, a buffer memory, and a controller coupled with the source, the statistics data relating to one or more parameters of the integrated circuit, the source being assigned a pre-selected time slot, the controller being operative to receive the statistics data from the source when the assigned pre-selected time slot is detected and to transfer the statistics data to the buffer memory;
a system memory external to the integrated circuit; and
a data processor external to the integrated circuit and coupled with the integrated circuit via the system memory;
wherein the buffer memory is instructed to transfer the statistics data to the system memory upon determining an availability of the data processor such that the statistics data can be accessed and retrieved by the data processor from the system memory for processing.

2. The system of claim 1, further comprising an external interface coupled between the buffer memory of the integrated circuit and the system memory external to the integrated circuit, wherein the buffer memory and the external interface are operative to transmit read control signals therebetween to coordinate the transfer of the statistics data from the buffer memory to the system memory and wherein the interface is operative to transmit a read control signal upon determining the availability of the data processor external to the integrated circuit.

3. The system of claim 2, wherein the buffer memory is operative to transmit a second read control signal upon the accumulation of a predetermined amount of the statistics data in the buffer memory.

4. The system of claim 1, wherein the source comprises at least two modules and wherein each of the modules monitors a particular system function and generates corresponding statistics data.

5. The system of claim 1, further comprising a second source of statistics data connected with the controller, wherein the second source is assigned a second pre-selected time slot and wherein the controller is operative to receive the statistics data from the second source when the second assigned pre-selected time slot is detected, and to transfer the statistics data from the second source to the buffer memory.

6. The system of claim 1, wherein the controller comprises an output selector that is designed to perform a time division multiplexing operation in the transfer of the statistics data from the source to the buffer memory.

7. The system of claim 1, wherein the pre-selected time slot assigned to the source comprises a plurality of time slots and wherein the controller is operative to receive a part of the statistics data from the source when one of the plurality of time slots is detected.

8. The system of claim 1, wherein the buffer memory of the integrated circuit comprises a first amount of memory size and the system memory comprises a second amount of memory size and wherein the first amount is not greater than the second amount.

9. The system of claim 1, wherein the buffer memory and the controller are operative to transmit write control signals therebetween to coordinate the writing of the statistics data to the buffer memory.

10. The system of claim 1, wherein the one or more parameters comprise at least one selected from a group consisting of voltage level and antenna gain.

11. The system of claim 1, wherein the statistics data characterizes at least one of system performance and operating conditions.

12. The system of claim 1, wherein the data processor analyzes the statistics data after the statistics data has been transferred to the system memory external to the integrated circuit.

13. The system of claim 1, wherein the integrated circuit further comprises a second source of diagnostics data relating to a clock line, wherein the second source is connected with the controller, wherein the controller is operative to receive the diagnostics data from the second source and to output the diagnostics data from the integrated circuit without storing the diagnostics data in the buffer memory of the integrated circuit.

14. The system of claim 1, wherein the integrated circuit is an application-specific integrated circuit (ASIC).

15. The system of claim 1, wherein the system memory external to the integrated circuit is an existing memory of the system.

16. The system of claim 15, wherein the existing memory is designed for use by other functions of the system.

17. The system of claim 16, wherein the controller of the integrated circuit is operative to utilize unused regions of the existing memory to store the statistics data from the integrated circuit.

18. The ASIC of claim 17, wherein the buffer memory is coupled with the external memory via an external interface, wherein the buffer memory and the external interface are operative to transmit read control signals therebetween to coordinate the transfer of the statistics data from the buffer memory to the external memory, and wherein the external interface is operative to transmit a read control signal to the buffer memory upon determining the availability of the data processor.

19. The ASIC of claim 17, further comprising a second source of diagnostics data relating to a clock line, wherein the controller also receives the diagnostics data from the second source, wherein the controller provides the statistics data to the buffer memory for storage prior to being provided to the external memory, and wherein the controller provides the diagnostics data as an output of the ASIC without storing in the buffer memory.

20. An application-specific integrated circuit (ASIC) coupled with an external data processor via an existing external memory, the ASIC comprising:
   a source of statistics data relating to one or more parameters of the ASIC;
   a controller for receiving the statistics data at a pre-selected time slot from the source;
   a first signal line;
   a second signal line; and
   a buffer memory coupled with the controller via the first and second signal lines;
   wherein the controller is operative to receive the statistics data when the pre-selected time slot is detected, and to write the statistics data to the buffer memory via the first signal line;
   wherein the buffer memory and the controller are operative to transmit write control signals therebetween via the second signal line to coordinate the writing of the statistics data to the buffer memory; and
   wherein the buffer memory is instructed to transfer the statistics data to the external memory upon determining an availability of the data processor such that the statistics data can be accessed and retrieved by the data processor from the external memory for processing.

21. The ASIC of claim 20, wherein the first signal line comprises a one-way transmission line and wherein the second signal line comprises a two-way transmission line.

* * * * *